US011778323B2

(12) United States Patent
Ohishi

(10) Patent No.: US 11,778,323 B2
(45) Date of Patent: Oct. 3, 2023

(54) CAMERA ACCESSORY AND METHOD OF TRANSMITTING INFORMATION

(71) Applicant: NIKON CORPORATION, Tokyo (JP)

(72) Inventor: Sueyuki Ohishi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/973,537

(22) PCT Filed: Jul. 12, 2019

(86) PCT No.: PCT/JP2019/027747
§ 371 (c)(1),
(2) Date: Apr. 7, 2021

(87) PCT Pub. No.: WO2020/017461
PCT Pub. Date: Jan. 23, 2020

(65) Prior Publication Data
US 2021/0227140 A1    Jul. 22, 2021

(30) Foreign Application Priority Data

Jul. 20, 2018 (JP) ................................ 2018-137271

(51) Int. Cl.
*H04N 23/68* (2023.01)
*H04N 23/661* (2023.01)
*H04N 23/663* (2023.01)

(52) U.S. Cl.
CPC ......... *H04N 23/687* (2023.01); *H04N 23/661* (2023.01); *H04N 23/663* (2023.01)

(58) Field of Classification Search
CPC .. H04N 5/23287; H04N 5/23209; G02B 7/10; G02B 27/646; G03B 5/00; G03B 17/14
See application file for complete search history.

(56) References Cited

U.S. PATENT DOCUMENTS

| 2002/0009650 A1 | 1/2002 | Michot et al. |
| 2010/0252782 A1 | 10/2010 | Masahiro |
| 2011/0317061 A1 | 12/2011 | Imafuji et al. |
| 2012/0033954 A1* | 2/2012 | Wakamatsu ............. G03B 5/00 |
| | | 359/557 |

(Continued)

FOREIGN PATENT DOCUMENTS

| CN | 106125458 A | 11/2016 |
| JP | H10-161172 A | 6/1998 |

(Continued)

OTHER PUBLICATIONS

Oct. 15, 2019 Search Report issued in International Patent Application No. PCT/JP2019/027747.

(Continued)

*Primary Examiner* — Christopher K Peterson
(74) *Attorney, Agent, or Firm* — Oliff PLC

(57) ABSTRACT

A camera accessory that is attachable to and detachable from a camera body, includes: a correction optical system that is movable in a direction intersecting an optical axis thereof; and a first communication unit that transmits to the camera body a first information regarding a position of the correction optical system and a second information regarding a vibration of the camera accessory.

20 Claims, 6 Drawing Sheets

(56) References Cited

U.S. PATENT DOCUMENTS

| | | | | |
|---|---|---|---|---|
| 2012/0294598 A1* | 11/2012 | Oikawa | ............... | G03B 17/14 |
| | | | | 396/125 |
| 2015/0116592 A1* | 4/2015 | Suzuki | ............... | G03B 17/565 |
| | | | | 348/375 |
| 2017/0013199 A1* | 1/2017 | Kunugi | ............... | G02B 7/14 |
| 2017/0130071 A1 | 5/2017 | Hatakeyama et al. | | |
| 2017/0257574 A1* | 9/2017 | Honjo | ............... | H04N 5/3572 |

FOREIGN PATENT DOCUMENTS

| | | |
|---|---|---|
| JP | H11-38461 A | 2/1999 |
| JP | H11-64911 A | 3/1999 |
| JP | 2000-105402 A | 4/2000 |
| JP | 2002-099013 A | 4/2002 |
| JP | 2010-237514 A | 10/2010 |
| JP | 2011-180302 A | 9/2011 |
| JP | 2012-237932 A | 12/2012 |
| JP | 2013-033185 A | 2/2013 |
| JP | 2015-075644 A | 4/2015 |
| JP | 2018-105938 A | 7/2018 |
| TW | 200927860 A | 7/2009 |
| TW | 201734149 A | 10/2017 |
| WO | 2013/168742 A1 | 11/2013 |

OTHER PUBLICATIONS

Jan. 11, 2021 Office Action and Search Report issued in Taiwanese Patent Application No. 108111460.

Jul. 28, 2021 Office Action issued in Chinese Patent Application No. 201980047953.4.

May 7, 2022 Office Action issued in Chinese Patent Application No. 201980047953.4.

Feb. 8, 2022 Office Action issued in Japanese Patent Application No. 2020-531295.

Jul. 5, 2022 Office Action issued in Japanese Patent Application No. 2020-531295.

Oct. 10, 2022 Office Action issued in Chinese Patent Application No. 201980047953.4.

* cited by examiner

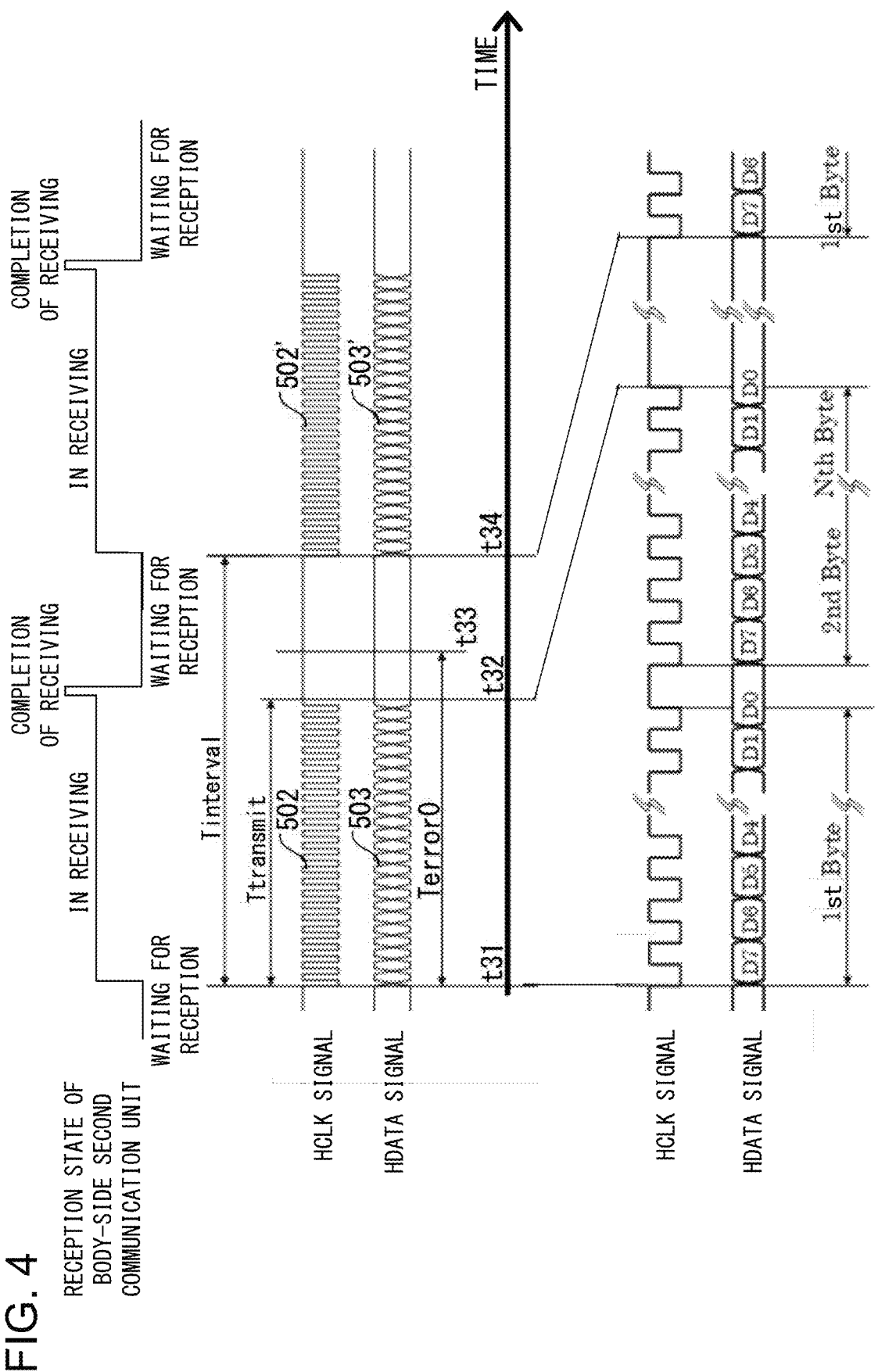

FIG. 5

| DATA | DATA 92 |
|---|---|
| DATA | DATA CONTENT |
| 92a | LENS SIDE ROTATIONAL VIBRATION STATE (X-AXIS) |
| 92b | LENS SIDE ROTATIONAL VIBRATION STATE (Y-AXIS) |
| 92c | LENS SIDE TRANSLATIONAL VIBRATION STATE (X-AXIS) |
| 92d | LENS SIDE TRANSLATIONAL VIBRATION STATE (Y-AXIS) |
| 92e | VALID / INVALID INFORMATION (X-AXIS) |
| 92f | VALID / INVALID INFORMATION (Y-AXIS) |
| 92g | MOVING STATE OF VIBRATION CORRECTION LENS |
| 92h | POSITION OF VIBRATION CORRECTION LENS (X-AXIS) |
| 92i | POSITION OF VIBRATION CORRECTION LENS (Y-AXIS) |
| 92j | LENS SIDE VIBRATION CORRECTION AMOUNT (X-AXIS) |
| 92k | LENS SIDE VIBRATION CORRECTION AMOUNT (Y-AXIS) |
| 92l | LENS SIDE TOTAL VIBRATION AMOUNT (X-AXIS) |
| 92m | LENS SIDE TOTAL VIBRATION AMOUNT (Y-AXIS) |
| 92n | LENS SIDE RESIDUAL VIBRATION AMOUNT (X-AXIS) |
| 92o | LENS SIDE RESIDUAL VIBRATION AMOUNT (Y-AXIS) |

CAMERA ACCESSORY AND METHOD OF TRANSMITTING INFORMATION

TECHNICAL FIELD

The present invention relates to a camera accessory and a method of transmitting an information.

BACKGROUND ART

A technique for transmitting information indicating the state of an interchangeable lens to a camera body is known (see Patent Literature 1: PTL 1). However, if the transmitted information is inappropriate, the vibration correction performance will be compromised.

CITATION LIST

Patent Literature

PTL 1: Japanese Laid-Open Patent Publication No. 2000-105402

SUMMARY OF INVENTION

According to a first aspect of the present invention, a camera accessory is attachable to and detachable from a camera body, and comprises: a correction optical system that is movable in a direction intersecting an optical axis thereof; and a first communication unit that transmits to the camera body a first information regarding a position of the correction optical system and a second information regarding a vibration of the camera accessory.

According to a second aspect of the present invention, a method of transmitting information is a method for transmitting information between a camera accessory that is attachable to and detachable from a camera body and the camera body, and transmits, between the camera body and the camera accessory, a first information regarding a position of a correction optical system that is movable in a direction intersecting an optical axis thereof and a second information regarding a vibration of the camera accessory.

BRIEF DESCRIPTION OF DRAWINGS

FIG. 4 is a diagram exemplifying hotline communication.

FIG. 5 is a diagram exemplifying information contained in hotline data.

DESCRIPTION OF EMBODIMENTS

Hereinafter, embodiments for carrying out the invention will be described with reference to the drawings.

Figure 1:
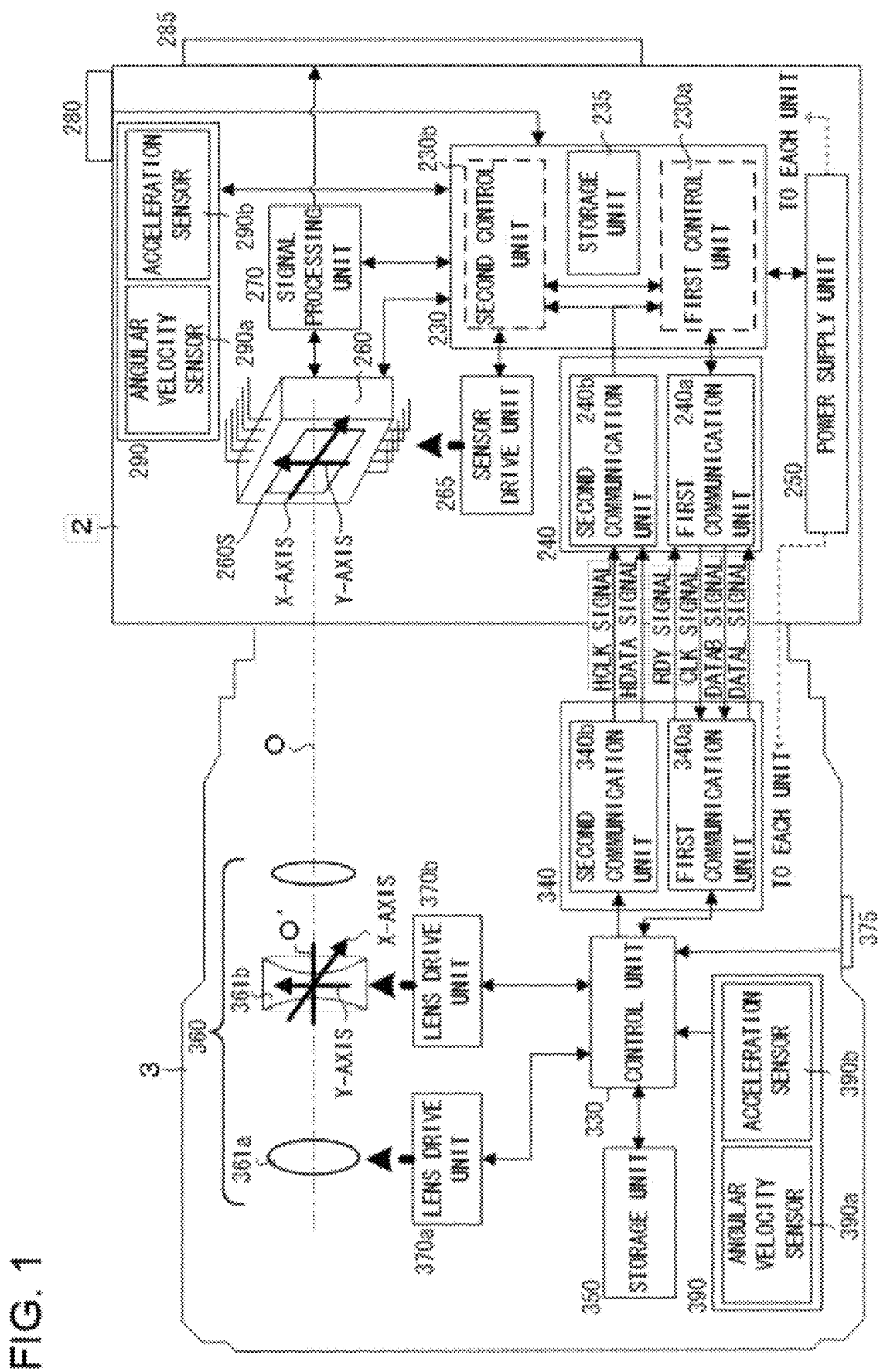
FIG. 1 is a block diagram explaining a main part structure of a camera system.

FIG. 1 is a block diagram illustrating a main part structure of a camera system 1. In the camera system 1 of the present embodiment, an interchangeable lens 3 is detachably attached to a camera body 2. In FIG. 1, an optical axis O of the interchangeable lens 3, and the X-axis direction and the Y-axis direction in the plane intersecting the optical axis O are shown by lines, respectively.

Camera Body

The camera body 2 includes a body-side control unit 230, a body-side communication unit 240, a power supply unit 250, an image sensor 260, a sensor drive unit 265, a signal processing unit 270, an operation member 280, a vibration sensor 290, and a display unit 285. The body-side control unit 230 is connected to the body-side communication unit 240, the power supply unit 250, the image sensor 260, the sensor drive unit 265, the signal processing unit 270, the operation member 280, and the vibration sensor 290.

The image sensor 260 is, for example, a solid-state image sensor such as a CMOS image sensor or a CCD image sensor. The image sensor 260 captures a subject image on an image capturing surface 260S according to a control signal from the body-side control unit 230 and outputs a signal. The image sensor 260 is capable of capturing a moving image and a still image. Capturing of a moving image includes, in addition to recording a moving image, capturing of a so-called through image for continuously displaying an image formation state on the display unit 285.

The signal having been output from the image sensor 260 is used by the signal processing unit 270 to generate image data for through images and image data for capturing a still image. The image sensor 260 is connected to the signal processing unit 270 and the body side control unit 230.

The signal processing unit 270 performs a predetermined image processing on the signal output from the image sensor 260 to generate image data. The generated image data is recorded in a storage medium (not shown) in a predetermined file format and/or is used for image display by the display unit 285. The signal processing unit 270 is connected to the body-side control unit 230, the image sensor 260, and the display unit 285.

The body-side communication unit 240 performs a predetermined communication with a lens-side communication unit 340 of the interchangeable lens 3. The body-side communication unit 240 transmits a signal to the body-side control unit 230. The body-side communication unit 240 includes a body-side first communication unit 240a and a body-side second communication unit 240b. The body-side first communication unit 240a performs a command data communication described later with the interchangeable lens 3, and the body-side second communication unit 240b performs a hotline communication described later with the interchangeable lens 3.

The body-side first communication unit 240a is connected to a body-side first control unit 230a which will be described later, and information transmitted and received between the camera body 2 and the interchangeable lens 3 in the command data communication is output by or input to the body-side first control unit 230a. The body-side second communication unit 240b is connected to the body-side first control unit 230a, and to a body-side second control unit 230b described later, and information being transmitted from the interchangeable lens 3 to the camera body 2 in the hotline communication is transmitted to the body-side first control unit 230a and the body-side second control unit 230b.

The power supply unit 250 converts the voltage of the battery (not shown) into the voltage used in each unit of the camera system 1 and supplies it to each unit of the camera body 2, and to the interchangeable lens 3. The power supply unit 250 can switch on and off of power supply to each power supply destination according to the instruction of the body-side control unit 230.

The vibration sensor 290 detects a vibration of the camera body 2 caused by to camera shake or the like. The vibration sensor 290 includes an angular velocity sensor 290a and an acceleration sensor 290b. The vibration sensor 290 separately detects a X-axis direction component and a Y-axis direction component of an angular vibration and a translational vibration.

The angular velocity sensor 290a detects an angular velocity generated by the rotational movement of the camera body 2. The angular velocity sensor 290a detects, for example, rotation around an axis parallel to the X axis and rotation around an axis parallel to the Y axis, respectively, and outputs each detection signal to the body-side control unit 230.

Further, the acceleration sensor 290b detects an acceleration generated by the translational motion of the camera body 2. The acceleration sensor 290b detects, for example, an acceleration in a direction parallel to the X-axis and an acceleration in a direction parallel to the Y-axis, respectively, and outputs each detection signal to the body-side control unit 230.

The angular velocity sensor 290a and the acceleration sensor 290b can each periodically output a detection signal at a cycle shorter than a cycle of the hotline communication.

The body-side control unit 230 is configured with a microcomputer, peripheral circuits thereof, and the like. The body-side control unit 230 includes a storage unit 235. The storage unit 235 is controlled by the body-side control unit 230 to record and read out data. The storage unit 235 stores a control program or the like to be executed by the body-side control unit 230. The body-side control unit 230 executes a control program stored in the storage unit 235 to control each unit in the camera body 2.

The body-side control unit 230 includes the body-side first control unit 230a and the body-side second control unit 230b. The body-side first control unit 230a mainly controls the entire camera body 2. The body-side second control unit 230b is connected to the sensor drive unit 265 and mainly controls a vibration correction operation for moving the image sensor 260 in a direction intersecting the optical axis. Since the body-side second control unit 230b mainly controls the vibration correction operation, it is possible to quickly control the vibration correction. The body-side first control unit 230a instructs the body-side second control unit 230b to start and stop the vibration correction. Between the body-side first control unit 230a and the body-side second control unit 230b, data and instructions necessary for each other are appropriately transmitted and received.

The sensor drive unit 265 includes, for example, an actuator, a drive mechanism, and a position detection unit. The sensor drive unit 265 moves the image sensor 260 in a direction intersecting the optical axis O based on an instruction output from the body-side control unit 230. By moving the image sensor 260 in the direction intersecting the optical axis O, vibration of the subject image (image shake) on the image capturing surface 260S of the image sensor 260 is suppressed. The sensor drive unit 265 detects the position of the image sensor 260 in the direction intersecting the optical axis O by a position detection unit such as a Hall element.

The operation member 280 including a release button, an operation switch, and the like is provided on an exterior surface of the camera body 2. The operation member 280 sends an operation signal corresponding to a user's operation to the body-side control unit 230. The user issues a shooting instruction, a shooting condition setting instruction, and the like by operating the operation member 280. Further, by operating the operation member 280, the user can instruct to turn on or off the vibration isolation function or instruct whether the vibration isolation mode is set to a sports mode or a normal mode. The sports mode is a mode in which, for instance, a movable range is reduced, and which is suitable for vibration correction under the conditions that the shutter speed is to be increased such as when chasing a fast-moving subject, and when changing the composition frequently. In the normal mode, effect of vibration correction is enhanced by, for instance, increasing the movable range to match with a mechanical movable range, to enhance the.

The display unit 285 is configured with, for example, a liquid crystal display panel. The display unit 285, according to an instruction from the body-side control unit 230, displays an image based on the image data processed by the signal processing unit 270, an operation menu screen, and the like. Shooting conditions or the like may be set by operating a touch panel on the display unit 285 instead of the operating member 280.

Interchangeable Lens

The interchangeable lens 3 includes a lens-side control unit 330, a lens-side communication unit 340, a lens-side storage unit 350, an imaging optical system 360, a lens drive unit 370, an instruction unit 375, and a vibration sensor 390. The lens-side control unit 330 is connected to the lens-side communication unit 340, the lens-side storage unit 350, the lens drive unit 370, the instruction unit 375, and the vibration sensor 390.

The lens-side control unit 330 is configured with a microcomputer, peripheral circuits thereof, and the like. The lens-side control unit 330 executes a control program stored in the lens-side storage unit 350, and controls each unit of the interchangeable lens 3, such as for automatic focus adjustment control and vibration correction control. The vibration correction control by the lens-side control unit 330 will be described later.

The lens-side storage unit 350 is configured with a non-volatile storage medium. The lens-side storage unit 350 is controlled by the lens-side control unit 330 to record and read out data. The lens-side storage unit 350 stores the vibration isolation coefficient of the imaging optical system 360, and the cutoff frequency and coefficient according to the vibration isolation mode and the vibration state, in addition to storing the control program executed by the lens-side control unit 330.

The imaging optical system 360 has a plurality of lenses and an aperture member and forms a subject image on a focusing plane (the image capturing surface 260S). At least a part of the imaging optical system 360 is configured to be movable in the interchangeable lens 3 as a moving member.

The imaging optical system 360 includes, for example, a focusing lens 361a as a moving member and a vibration correction lens 361b as a moving member.

The lens drive unit 370 moves the moving members and includes a lens drive unit 370a and a lens drive unit 370b. Each lens drive unit 370 includes an actuator, a drive mechanism, and a position detection unit for the moving member. The lens-side control unit 330 periodically creates position information of the moving member with signals from the position detection unit and/or the actuator of the lens drive unit 370. Further, from the signal from the position detection unit and/or the actuator of the lens drive unit 370, the moving state, such as whether or not the moving member is being moved, the moving direction of the moving member, and whether or not the moving member is stopped, is determined by the lens-side control unit 330 periodically. The cycle in which the position information of the moving member is created and the cycle in which the moving state of the moving member is determined can be shorter than the cycle of the hotline communication.

The focusing lens 361*a* is configured to be able to move forward and backward in the optical axis O direction by the lens drive unit 370*a*. By moving the focusing lens 361*a*, the focal position of the imaging optical system 360 is adjusted. Drive instructions such as the moving direction, moving amount, and moving speed of the focusing lens 361*a*, may be instructed from the body-side control unit 230, or may be instructed from the lens-side control unit 330 in consideration of the instruction from the body-side control unit 230. The focusing lens 361*a* is configured so that the position thereof in the optical axis O direction can be detected by an encoder or the like of the lens drive unit 370*a*.

The vibration correction lens 361*b* is configured to be able to move in a direction intersecting the optical axis O by the lens drive unit 370*b*. By moving the vibration correction lens 361*b*, shaking (image shake) of the subject image on the image capturing surface 260S of the image sensor 260 is suppressed. The moving direction, moving amount, moving speed, etc. of the vibration correction lens 361*b* are instructed by the lens-side control unit 330 based on the detection signal of the vibration sensor 390. The position of the vibration correction lens 361*b* is arranged to be detectable by a Hall element or the like of the lens drive unit 370*b*. As the position information of the vibration correction lens 361*b*, the lens drive unit 370*b* detects, for example, a position of an optical axis O' of the vibration correction lens 361*b* in the plane intersecting the optical axis O. That is, the coordinate value in the X-axis direction and the coordinate value in the Y-axis direction of the optical axis O' of the vibration correction lens 361*b* with respect to the optical axis O as the origin position are detected. Thereby, the position information of the vibration correction lens 361*b* can be expressed by the position in the X-axis direction and the position in the Y-axis direction of the optical axis O' and can also be expressed by the moving amount (coordinates value difference) in the X-axis direction and the moving amount in the Y-axis direction of the optical axis O'.

The instruction unit 375 is provided on an outer cylinder of the interchangeable lens 3, for example. By operating the instruction unit 375, the user can adjust settings of the vibration correction of the interchangeable lens 3, such as by instructing to turn on or off the vibration correction function, and by setting the vibration isolation mode to the sports mode or the normal mode. The operation signal according to the user's instruction operation is transmitted from the instruction unit 375 to the lens-side control unit 330.

The vibration sensor 390 detects the vibration of the interchangeable lens 3 caused by camera vibration or the like. The vibration sensor 390 is equivalent to the vibration sensor 290 in the camera body 2. The vibration sensor 390 includes an angular velocity sensor 390*a* and an acceleration sensor 390*b*, and outputs each detection signal to the lens-side control unit 330. The angular velocity sensor 390*a* and the acceleration sensor 390*b* can each periodically output a detection signal at a cycle shorter than the cycle of the hotline communication.

The lens-side communication unit 340 performs a predetermined communication with the body-side communication unit 240. The lens-side communication unit 340 includes a lens-side first communication unit 340*a* and a lens-side second communication unit 340*b*. The lens-side first communication unit 340*a* performs the command data communication described later with the camera body 2, and the lens-side second communication unit 340*b* performs the hotline communication described later to the camera body 2.

The lens-side first communication unit 340*a* is connected to the lens-side control unit 330, and the information to be transmitted from the interchangeable lens 3 to the camera body 2 by the command data communication is created by the lens-side control unit 330. The lens-side second communication unit 340*b* is also connected to the lens-side control unit 330, and the information to be transmitted from the interchangeable lens 3 to the camera body 2 by the hotline communication is created by the lens-side control unit 330, the lens-side second communication unit 340*b*, and the like.

Arrows between the lens-side communication unit 340 and the body-side communication unit 240 in FIG. 1 indicate the signal flow.

The lens-side first communication unit 340*a* outputs to the body-side first communication unit 240*a*, a signal (hereinafter, RDY signal) indicating whether or not the interchangeable lens 3 is ready for the command data communication, and a data signal (hereinafter, DATAL signal). The body-side first communication unit 240*a* outputs to the lens-side first communication unit 340*a*, a clock signal for the command data communication (hereinafter, CLK signal) and a data signal (hereinafter, DATAB signal).

The lens-side second communication unit 340*b* outputs to the body-side second communication unit 240*b*, a clock signal for the hotline communication (hereinafter, HCLK signal) and a data signal (hereinafter, HDATA signal).

The hotline communication is unidirectional data communication from the interchangeable lens 3 to the camera body 2, and the command data communication is bidirectional data communication between the interchangeable lens 3 and the camera body 2.

Details of Communication

Since the camera system 1 is provided with two independent communication systems of the command data communication and the hotline communication, these communications can be performed in parallel. That is, the camera body 2 and the interchangeable lens 3 can start and end the hotline communication during the command data communication. It is also possible to perform the command data communication while performing the hotline communication. Therefore, the interchangeable lens 3 can continuously transmit data to the camera body 2 by the hotline communication even during the command data communication. For example, even if the time required for the command data communication increases due to an increase in the amount of data, the hotline communication can be performed at a desired timing.

Further, the camera body 2 can transmit various instructions and requests to the interchangeable lens 3 at any timing and receive data from the interchangeable lens 3 at any timing by the command data communication even while receiving data by the hotline communication.

Figure 2:
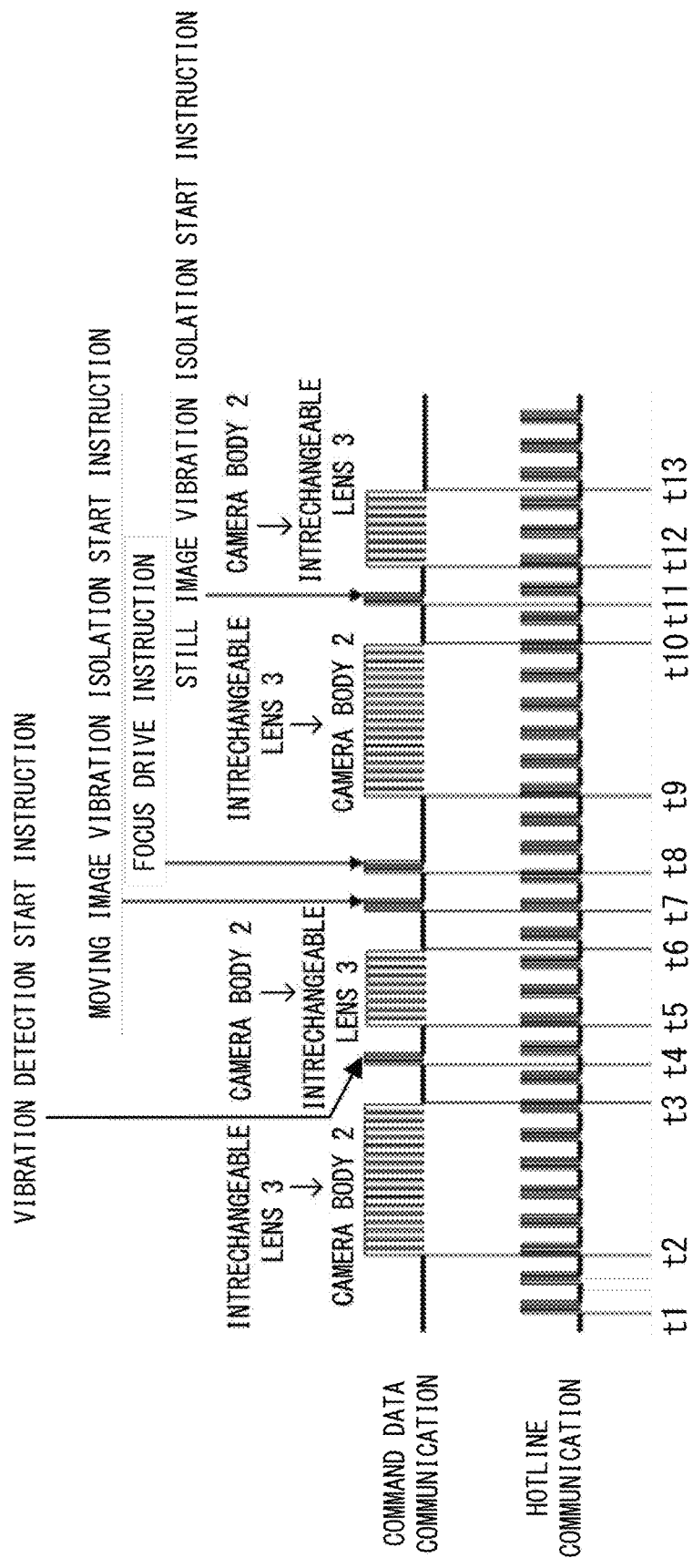
FIG. 2 is a timing chart exemplifying command data communication and hotline communication.

FIG. 2 is a timing chart exemplifying the command data communication and the hotline communication. The camera body 2, after instructing the start of the hotline communication through the command data communication, for example, after time t1, periodically receives data from the interchangeable lens 3 by the hotline communication.

Further, the camera body 2 transmits and receives data to and from the interchangeable lens 3 by the command data communication. Specifically, between times t2 and t3 and between times t9 and t10, the camera body 2 sends a transmission instruction to the interchangeable lens 3 and receives various data. Between times t5 and t6 and between times t12 and t13, the camera body 2 transmits various data to the interchangeable lens 3. Further, at times t4, t7, t8 and t11 between the above communications, the camera body 2 transmits to the interchangeable lens 3 instructions regarding the movement control of the moving member, such as, a vibration detection start instruction, a moving image vibration isolation start instruction, a still image vibration isolation start instruction and a focus drive instruction.

In the command data communication according to the present embodiment, there are many types of data to be transmitted and received, and the frequency of instructions to the interchangeable lens 3 is high. Further, since a time period required for transmitting and receiving becomes longer depending on the type of data, the time periods for transmitting and receiving various data between times t2 and t3, t5 and t6, t9 and t10, and t12 and t13, are longer than the time periods for transmitting instructions at times t4, t7, t8 and t11, respectively.

The interchangeable lens 3, in response to the instruction transmitted by the command data communication from the camera body 2, transmits, for example, data indicating information of the interchangeable lens 3 (focal length, shooting distance, aperture value, optical characteristics of the imaging optical system 360, etc.) to the camera body 2. Furthermore, the interchangeable lens 3 receives data indicating information (frame rate, settings of the camera body 2, etc.) of the camera body 2 transmitted from the camera body 2.

Since the command data communication requires a long time period for transmitting and receiving at one time and also the frequency of transmitting and receiving is high, it is difficult to continuously perform data communication in a short cycle.

On the other hand, since the hotline communication uses a communication terminal different from a communication terminal used for the command data communication, a data communication from the interchangeable lens 3 to the camera body 2 can be continuously performed in a shorter cycle. For example, the hotline communication can be performed at a desired timing during a period from startup processing to shutdown processing of the camera body 2 including during an exposure.

A start instruction and an end instruction of the hotline communication are transmitted from the camera body 2 to the interchangeable lens 3 by the command data communication, however, it is not limited to this.

Description of Command Data Communication

Figure 3:
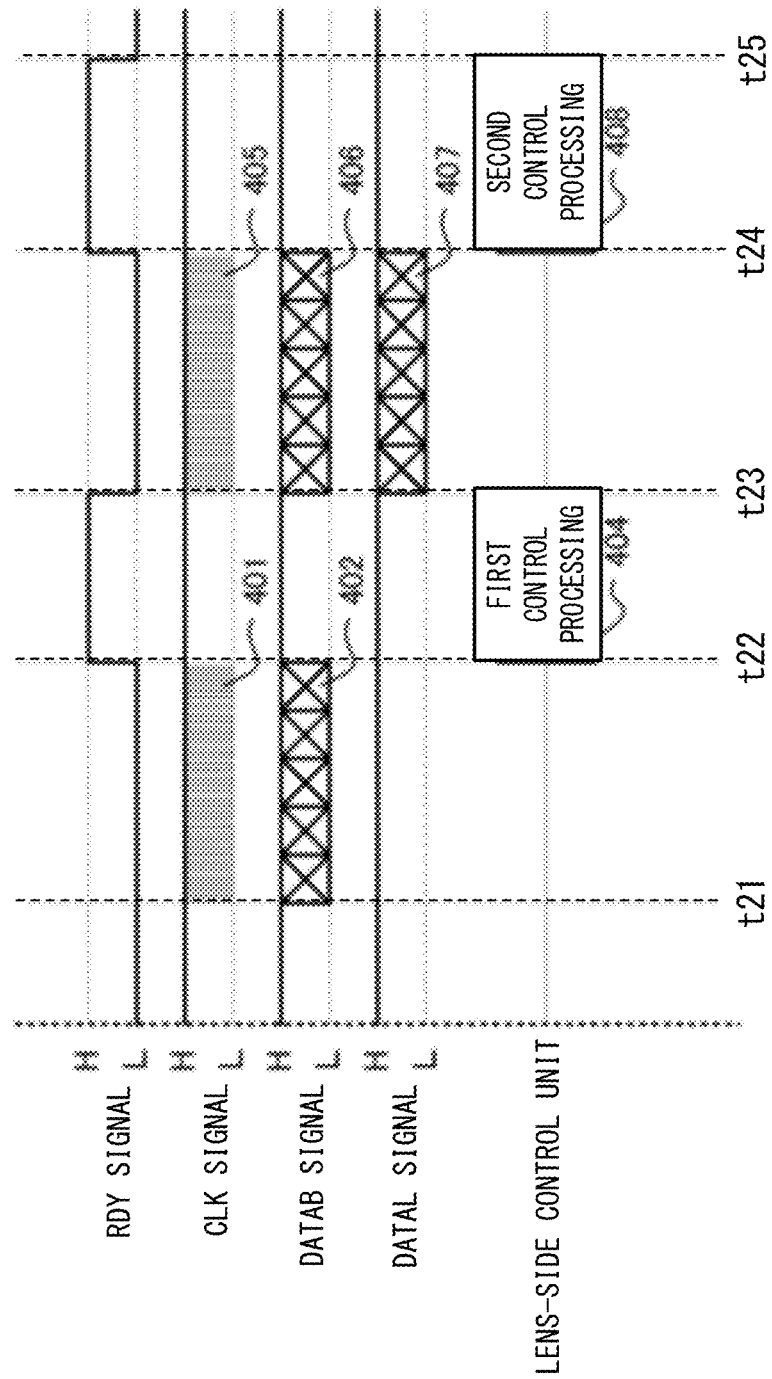
FIG. 3 is a diagram exemplifying command data communication.

Next, the command data communication will be described with reference to FIG. 3. FIG. 3 exemplifies the timings of the RDY signal, the CLK signal, the DATAB signal, and the DATAL signal.

In one command data communication, after one command packet 402 is transmitted from the camera body 2 to the interchangeable lens 3, data packets 406 and 407 are transmitted to and received from the camera body 2 and the interchangeable lens 3.

The lens-side first communication unit 340a sets the potential of the RDY signal to a L level at the time (t21) of start of the command data communication. Upon the RDY signal being set to the L level, the body-side first communication unit 240a starts outputting the CLK signal 401. The frequency of the CLK signal 401 is, for example, 8 MHz. The body-side first communication unit 240a outputs the DATAB signal including a command packet 402 having a predetermined length in synchronization with the clock signal 401. The command packet 402 is expressed by switching over of the H level and the L level. The body-side first communication unit 240a outputs the CLK signal 401 for a period corresponding to the data length of the command packet 402, and then ends the output of the CLK signal (t22).

The command packet 402 includes, for example, data for synchronization, data for identifying the order of the command data communication, data indicating an instruction from the camera body 2, data indicating the data length of the subsequent data packet 406, and data for checking communication error. The instructions included in the command packet 402 are, for example, an instruction from the camera body 2 to the interchangeable lens 3 to drive the moving member, an instruction to transmit data from the camera body 2 to the interchangeable lens 3, and the like.

The interchangeable lens 3 may determine the presence or absence of a communication error based on whether or not a value calculated from the received command packet 402 matches the data for checking communication error included in the command packet 402.

Upon completing reception of the command packet 402, the lens-side first communication unit 340a sets the RDY signal to the H level, and the lens-side control unit 330 starts a first control processing 404 based on the command packet 402 (t22).

The lens-side first communication unit 340a can set the RDY signal to the L level upon completing the first control processing 404 by the lens-side control unit 330 (t23). Upon the received RDY signal being set to the L level, the body-side first communication unit 240a outputs the CLK signal 405.

The body-side first communication unit 240a outputs the DATAB signal including the data packet 406 in synchronization with the CLK signal 405. Further, the lens-side first communication unit 340a outputs the DATAL signal including the data packet 407 having a predetermined length in synchronization with the CLK signal 405. The data packets 406 and 407 are expressed by switching over of the H level and the L level. The body-side first communication unit 240a outputs the CLK signal 405 for a period corresponding to the data length of the data packet 406, and then ends the output of the CLK signal (t24).

The data packets 406 and 407 are variable length data having the number of data indicated by the command packet 402. The data packets 406 and 407 include data for synchronization, data indicating information of the camera body 2, data indicating information of the interchangeable lens 3, data for checking communication errors, and the like.

The data packet 406 transmitted from the camera body 2 to the interchangeable lens 3 includes data indicating a driving amount of the moving member, data for communicating settings and an operating state of the camera body 2, and the like.

The data packet 407 transmitted from the interchangeable lens 3 to the camera body 2 includes data indicating the model name information of the interchangeable lens 3, data indicating a state of vibration correction in the interchangeable lens 3, and data relating to the optical characteristics of the imaging optical system 360.

A device on the receiving side (which is either the interchangeable lens 3 or the camera body 2) may determine the presence or absence of a communication error depends on whether or not a value calculated from the received data packet 406 or 407 matches the data for communication error included in the data packet 406 or 407.

Upon completion of transmitting and receiving the data packets 406 and 407, the lens-side first communication unit 340a sets the RDY signal to the H level, and the lens-side control unit 330 starts a second control processing 408 based on the data packets 406 and 407 (t24).

Description of First Control Processing and Second Control Processing

Next, examples of the first control processing 404 and the second control processing 408 of the command data communication will be described.

For example, it is assumed that the command packet 402 includes a drive instruction of the focusing lens 361*a*. The lens-side control unit 330, as the first control processing 404, generates the data packet 407 indicating that the driving instruction of the focusing lens 361*a* has been received.

Next, the lens-side control unit 330, as the second control processing 408, instructs the lens drive unit 370*a* to move the focusing lens 361*a* by the moving amount indicated by the data packet 406. Thereby, the focusing lens 361*a* starts moving along the optical axis O direction. Upon an instruction being issued from the lens-side control unit 330 to the lens drive unit 370*a* to move the focusing lens 361*a*, the lens-side first communication unit 340*a* determines that the second control processing 408 is completed, and sets the RDY signal to the L level (t25).

Further, for example, when the command packet 402 includes an instruction to start the hotline communication, the lens-side control unit 330 generates the data packet 407 indicating that the hotline communication start instruction has been received as the first control processing 404. Then, the lens-side control unit 330 starts the hotline communication by the lens-side second communication unit 340*b* as the second control processing 408. Upon instructing to start the hotline communication, the lens-side control unit 330 determines that the second control processing 408 has been completed, and sets the RDY signal to the L level (t25).

Furthermore, for example, when the command packet 402 includes a drive instruction of vibration correction, the lens-side control unit 330, as the first control processing 404, generates the data packet 407 indicating that the drive instruction for the vibration correction lens 361*b* has been received.

Then, as the second control processing 408, the lens-side control unit 330 issues instructions to the lens drive unit 370*b* to move the vibration correction lens 361*b* based on the instructions regarding the correction factor (a sharing percentage of the vibration correction between the camera body 2 and the interchangeable lens 3) and the vibration correction control included in the data packet 406, and the output of the vibration sensor 390. Thereby, the movement of the vibration correction lens 361*b* in a direction intersecting the optical axis O is started. Upon an instruction being issued from the lens-side control unit 330 to the lens drive unit 370*b* to start driving the vibration correction lens 361*b*, the lens-side first communication unit 340*a* determines that the second control processing 408 has been completed and sets the RDY signal to the L level (t25).

Description of Hotline Communication

Next, the hotline communication will be described with reference to FIG. 4. FIG. 4 exemplifies the timing of the HCLK signal and the HDATA signal. In one hotline communication, one HDATA signal 503 is transmitted from the interchangeable lens 3 to the camera body 2 in synchronization with one HCLK signal 502.

In the camera system 1 according to the present embodiment, matters regarding the hotline communication are arranged in advance between the interchangeable lens 3 and the camera body 2 before transmitting and receiving the start instruction of the hotline communication. The matters regarding the hotline communication includes: for example, a length (the number of bytes) of the HDATA signal transmitted by one hotline communication, sets of data to be included in the HDATA signal and the order thereof, a clock frequency of the HCLK signal, a cycle (Tinterval in FIG. 4), and a communication time period in one cycle (Ttransmit in FIG. 4). In the present embodiment, the frequency of the HCLK signal is 2.5 MHz, the data length of one hotline communication is longer than that of the command packet 402, the cycle of one hotline communication is 1 millisecond, and a period of the communication time in one cycle is less than 75% of the interval of transmission, however, it is not limited to these. It is to be noted that one hotline communication refers to data transmission performed in one cycle of the hotline communication, and it is different from a series of events from the hotline communication start instruction until the hotline communication end instruction instructed by the camera body 2 through the command data communication.

First, the operation of the lens-side second communication unit 340*b* in the hotline communication will be described. Upon receiving the instruction to start the hotline communication through the command data communication before the time t31, the lens-side second communication unit 340*b* starts outputting the HCLK signal to the camera body 2 (t31). The HCLK signal is periodically output from the interchangeable lens 3, and is shown as the HCLK signals 502, 502', . . . in FIG. 4.

The lens-side second communication unit 340*b* outputs the HDATA signal in synchronization with the HCLK signal. The HDATA signal is expressed by switching over of the H level and the L level. One HDATA signal has a predetermined data length and is represented in FIG. 4 as N pieces of 1 bytes each including 8 bits D0 to D7. One HDATA signal may include an unused bit area and/or an unused byte area in order to have a fixed length. A predetermined initial value is input to the unused bit area or the unused byte area. The HDATA signal is periodically output from the interchangeable lens 3 in synchronization with the HCLK signals 502, 502', . . . , and is represented as HDATA signals 503, 503', . . . in FIG. 4.

Upon completion of transmission of the HDATA signal (t32), the lens-side second communication unit 340*b* stops the output of the HCLK signal until the time t34 when the transmission of the next HDATA signal is started. The times t31 to t32 are defined as one hotline communication, and the times t31 to t34 are defined as one cycle of the hotline communication. The lens-side second communication unit 340*b* starts the next hotline communication from the time t34.

The lens-side second communication unit 340*b* periodically performs the hotline communication until an instruction to end the hotline communication is transmitted by the camera body 2 through the command data communication.

The lens-side second communication unit 340*b* transmits HDATA signals 503, 503', . . . to the body-side second communication unit 240*b* by a built-in serial communication unit. The lens-side second communication unit 340*b* efficiently transfers data stored in a data area of a memory (not shown) as the HDATA signal by using, for example, a DMA (Direct Memory Access) function. The DMA function is a function that automatically accesses data in the memory without intervention by a CPU.

Next, the operation of the body-side second communication unit 240*b* in the hotline communication will be described. In the present embodiment, the body-side second communication unit 240*b* stands by in a receivable state after completion of an initialization process upon turning the power on or after determining to transmit the start instruction of the hotline communication through the command data communication.

After the transmission of the HDATA signal from the interchangeable lens 3 is started, upon completing (t32) the reception of the data of the predetermined length from the start time t31 for a predetermined time Terror® (time t33), the body-side second communication unit 240b determines that the communication has been performed normally and finalizes the received data. The predetermined time Terror® is a period of time in which a margin is added to the communication time Ttransmit for one cycle, and is set to, for example, 80% of one cycle. The body-side second communication unit 240b waits in a receivable state even after receiving the HDATA signal once, and starts receiving the next HDATA signal upon completing one cycle from the time t31 (t34).

In a case where the reception of data of a predetermined length has not been completed within the predetermined time Terror® after the transmission of the HDATA signal was started by the lens-side communication unit 340, the body-side second communication unit 240b determines that the communication was not completed properly (communication error) and discards the received data.

It is to be noted that, in the hotline communication, it is preferable that the communication time (Ttransmit) in one cycle does not exceed 75% so that the communication error processing can be performed between one cycle and the next cycle (between time t33 and t34), however, it is not limited to this.

Hotline Data

In one hotline communication, one hotline data 90 is transmitted from the interchangeable lens 3 to the camera body 2.

The hotline data 90 may include at least two types of information, that is, the position information of the moving member and information different from the position information of the moving member, for each moving member. In the present embodiment, the hotline data 90 includes first data 91 including the position information of the focusing lens 361a and the information that can be used for the movement control of the focusing lens 361a, and second data 92 including the position information of the vibration correction lens 361b and the information that can be used for the movement control of the vibration correction lens 361b. The information included in the first data 91 and the information included in the second data may be the same or partly different.

The information different from the position information of the moving member is information that can be used for the movement control of the moving member and can be set for each moving member. For example, it includes at least one of the reliability of the position information, the moving state of the moving member, and the operating state of the operating member such as the instruction unit 375. The above-mentioned information and situations are expressed in the form of numerical values or identifiers by the lens-side control unit 330, the lens-side second communication unit 340b, and the like, and are included in the hotline data 90.

With respect to the focusing lens 361a, the information indicating the position of the moving member indicates a relative or absolute position of the focusing lens 361a in the optical axis O direction and corresponds to the number of pulses of the actuator of the lens driving unit 370a and/or a detected value detected by the lens driving unit 370a. With respect to the vibration correction lens 361b, the information indicating the position of the moving member indicates a relative or absolute position of the vibration correction lens 361b in the plane intersecting the optical axis O and corresponds to a coordinate value, a moving amount or the like of the optical axis O' of the correction lens 361b in the plane intersecting the optical axis O. With respect to a zoom lens 361c, the information indicating the position of the moving member indicates a relative or absolute position of the zoom lens 361c in the optical axis O direction and corresponds to the number of pulses of an actuator of a lens driving unit 370c, a detected value detected by the lens driving unit 370c, or the like. With respect to an aperture 362, the information indicating the position of the moving member indicates a position of an aperture blade in the plane intersecting the optical axis O and corresponds to an aperture diameter (aperture value) formed by the aperture blades.

The reliability of the information indicating the position is represented by an identifier indicating whether the information indicating the position is valid or invalid, a numerical value indicating the reliability of the information indicating the position, and the like.

The moving state of the moving member is indicated by an identifier indicating whether or not the moving member is moving, an identifier indicating whether or not the moving member is in a movable state, an identifier indicating whether or not the moving member is being stopped, an identifier indicating whether or not the moving member is in a drive starting state, and an identifier indicating the moving direction of the moving member, and the like.

Description of Second Data 92

FIG. 5 is a diagram explaining information included in the second data 92.

The second data 92 includes at least one of, for example, data 92h to 92k regarding a vibration correction amount in the interchangeable lens 3, data 92l, 92m regarding a vibration amount on the image capturing surface 260S calculated by the interchangeable lens 3, data 92n, 92o regarding a residual vibration amount obtained from the detection signal detected by the vibration sensor 390 and from the position of the vibration correction lens 361b, data 92a to 92d regarding a vibration state detected by the vibration sensor 390, data 92e, 92f regarding the reliability of the vibration correction amount or the calculated vibration amount, and data 92g regarding a moving state of the vibration correction lens 361b.

The data 92a to 92d relate to a vibration state detected by the vibration sensor 390, and include an identifier selected by the lens-side control unit 330 based on the detection signal from the vibration sensor 390. The lens-side control unit 330 judges the vibration state from the detection signal of the vibration sensor 390. In the present embodiment, as the vibration state, a state in which a shooting composition is being changed, a state in which the shooting composition is stable, a state in which the camera body 2 is fixed to a tripod, and the like are determined. The lens-side control unit 330 selects any of the identifier indicating whether or not the shooting composition is being changed, the identifier indicating whether or not the shooting composition is stable, and the identifier indicating whether or not the camera body 2 is fixed to the tripod, and transmits the identifier as the hotline data 90. Further, the lens-side control unit 330 performs a vibration correction control suitable for each vibration state, such as by changing a cutoff frequency of the detection signal.

The data 92a shows the vibration state related to an angular vibration in the X-axis direction output by the vibration sensor 390. For example, the lens-side control unit 330 selects any of the identifier indicating whether or not the shooting composition is being changed, the identifier indicating whether or not the shooting composition is stable, and the identifier indicating whether being fixed to the tripod or not based on the angular vibration detection signal in the X-axis direction, and sets it as the data 92a.

The data 92b differs from the data 92a in that the above judgement is made with respect to the Y-axis direction.

The data 92c differs from the data 92a in that the above judgement is made with respect to a translational vibration.

The data 92d differs from the data 92a in that the above judgement is made with respect to a translational vibration in the Y-axis direction.

The body-side control unit 230 comes to know the judgement result of the vibration state in the interchangeable lens 3 from the data 92a to 92d. Therefore, the body-side second control unit 230b can perform the vibration correction control according to the judgement result of the vibration state in the interchangeable lens 3. It is to be noted that the body-side control unit 230 may also perform judgement of the vibration state based on the detection result of the vibration sensor 290, however, it is also possible to arrange that the body-side control unit 230 does not perform judgement of the vibration state based on the detection result of the vibration sensor 290.

The data 92g relates to the moving state of the vibration correction lens 361b, and includes an identifier selected by the lens-side control unit 330 based on a vibration control state of the interchangeable lens 3. In the present embodiment, the vibration control state includes a state engaged in a still image vibration isolation, a state engaged in a moving image vibration isolation, and a state not engaged in vibration correction. In the state not engaged in vibration correction, the lens drive unit 370b is not driven and the vibration correction is not performed. In the state engaged in the still image vibration isolation, a vibration correction suitable for capturing a still image is being performed based on a still image vibration isolation start instruction transmitted from the camera body 2 by the command data communication. In the state engaged in the moving image vibration isolation, a vibration correction suitable for capturing a moving image or a live view image is being performed based on a moving image vibration isolation start instruction transmitted from the camera body 2 by the command data communication. In general, a movable range of the vibration correction lens 361b is larger in the moving image vibration isolation than in the still image vibration isolation, so that the effect of vibration correction is enhanced.

The body-side control unit 230 comes to know the moving state of the vibration correction lens 361b from the data 92g and can reflect the moving state in the vibration correction control of the body-side control unit 230.

The data 92h to 92k relate to an amount of vibration corrected by the interchangeable lens 3 (a vibration correction amount), and are numerical values indicating a position of the vibration correction lens 361b by the lens drive unit 370b, or an amount of movement of the vibration correction lens 361b which was calculated by the lens-side control unit 330 based on the position of the vibration correction lens 361b.

The data 92h indicates the present position of the optical axis O' of the vibration correction lens 361b in the X-axis direction. In the present embodiment, the data 92h indicates a coordinate value in the X-axis direction detected in the interchangeable lens 3 by converting it into a coordinate value (an image plane conversion value) on the image capturing surface 260S of the image sensor 260. The image plane conversion value is calculated by multiplying the coordinate value of the vibration correction lens 361b detected in the interchangeable lens 3 by a vibration isolation coefficient. The vibration isolation coefficient indicates the amount of movement of the image plane on the imaging surface 260S with respect to a unit moving amount of the vibration correction lens 361b, and is a value that varies depending on the focal length and the shooting distance of the imaging optical system 360. The vibration isolation coefficient is stored in the lens-side storage unit 350 or the like. The lens-side control unit 330 reads out, from the lens-side storage unit 350, the vibration isolation coefficient according to the focal length and the shooting distance at the time when the coordinate value of the vibration correction lens 361b is detected, and calculates the image plane conversion value.

By calculating the image plane conversion value with the interchangeable lens 3, there is an effect that it is not necessary to transmit the vibration isolation coefficient according to the focal length and the shooting distance to the camera body 2. However, the value before image plane conversion may be transmitted to the camera body 2 by the hotline communication.

The data 92i differs from the data 92h in that the above determination is made with respect to the Y-axis direction.

The data 92j differs from the data 92h in that it is the amount of vibration correction obtained from the position of the vibration correction lens 361b by the lens-side control unit 330. For example, the lens-side control unit may set the data 92j to the same value as the data 92h, may use as the data 92j the coordinate value representing the position of the vibration correction lens 361b without image plane conversion, or may use the amount of movement of the vibration correction lens 361b calculated from the position of the vibration correction lens 361b as the data 92j.

The data 92k differs from the data 92j in that the above determination is made with respect to the Y-axis.

The body-side control unit 230 comes to know the amount of vibration corrected by the interchangeable lens 3 (the vibration correction amount), by the data 92h to 92k, and can reflect it in the vibration correction of the camera body 2.

The data 92l and 92m relate to an amount of vibration (a total amount of vibration) of the subject image on the image capturing surface 260S calculated by the interchangeable lens 3, and are numerical values calculated, by the lens-side control unit 330, from the detection signal of the vibration sensor 390 and the vibration isolation coefficient at the time of outputting the detection signal.

The data 92l shows the image plane converted value of the total amount of vibration in the X-axis direction detected in the interchangeable lens 3. The image plane conversion is as described above.

The data 92m differs from the data 92l in that the above determination is made with respect to the Y-axis.

The body-side control unit 230 comes to know the total vibration amount calculated in the interchangeable lens 3 from the data 92l and 92m, and can confirm whether or not the total vibration amount has been completely corrected.

The data 92n and 92o are numerical values related to a residual vibration amount obtained from the detection signal detected by the vibration sensor 390 and the position of the vibration correction lens 361b, and are calculated by the lens-side control unit 330. Here, the residual vibration amount may be a value obtained by subtracting the vibration correction amount represented by the data 92j, 92k from the total vibration amount represented by the data 92l, 92m. Since the residual vibration amount can be calculated also by the camera body 2, the residual vibration amount may be omitted from the hotline data 90 in a case where at least one of the vibration correction amount and the present position of the vibration correction lens 361b is sent in addition to the total vibration amount.

The data 92n is a value shown obtained by converting the residual amount of vibration in the X-axis direction that was left uncorrected by the interchangeable lens 3 onto the image capturing surface 260S of the image sensor 260. The image plane conversion is as described above.

The data 92o differs from the data 92n in that the above determination is made with respect to the Y-axis.

From the data 92n and 92o, the body-side control unit 230 comes to know the amount of vibration that remains even after performing the vibration correction control in the interchangeable lens 3. Thereby, the body-side control unit 230 can correct the vibration that could not be completely corrected by the interchangeable lens 3 without calculating the vibration amount from the detection signal of the vibration sensor 290.

The data 92e and 92f relate to the reliability of the position information of the vibration correction lens 361b and the reliability of the calculated vibration amount and the vibration correction amount, and each includes the identifier selected based on the reliability of the data 92h to 92o by the lens-side control unit 330. In the present embodiment, the data 92e and 92f indicate whether or not each of the data 92h to 92o is valid, however it is not limited to this.

The body-side control unit 230 comes to know the reliability of the data 92h to 92o from the data 92e and 92f, and can take measures such as discarding the unreliable data.

Description of Vibration Correction

The camera system 1 according to the present embodiment is configured so as to be able to perform both of a lens-side vibration correction by driving the vibration correction lens 361b by the lens drive unit 370b and a body-side vibration correction by driving the image sensor 260 by the sensor drive unit 265. Thereby, for example, it is possible to improve the vibration correction effect by performing the lens-side vibration correction by driving the vibration correction lens 361b and further performing the body-side vibration correction for the amount of vibration remaining through the lens-side vibration correction. Further, by collaboration of the lens-side vibration correction and the body-side vibration correction, it is possible to improve the vibration correction effect. In a case where the lens-side vibration correction and the body-side vibration correction collaborate, since the vibration state judged by the interchangeable lens 3 is transmitted to the camera body 2 by the hotline communication, the camera body 2 can perform a control with the vibration state being matched with the vibration state of the interchangeable lens 3.

As described above, the lens-side control unit 330 determines the vibration state based on the detection signal of the vibration sensor 390 from the state being fixed to the tripod, the shooting composition changing state, and the shooting composition stable state. Further, each of the lens-side control unit 330 and the body-side second control unit 230b can adjust the effect of the vibration correction by appropriately changing a threshold value, coefficient, or the like according to the vibration state.

For example, a movable range of the vibration correction lens 361b or the image sensor 260 (hereinafter referred to as a movable portion) and a frequency band of the vibration to be corrected can be changed according to the vibration state. In the state being fixed to the tripod, the vibration detection signal in the frequency band of about 10 Hz, which tends to occur in the state being fixed to the tripod, may be extracted for correction. In the shooting composition changing state, the frequency band may be limited to a specific range or the movable range may be reduced so as not to correct the movement of the interchangeable lens 3 intended by the user due to the composition change. In the shooting composition stable state, a range of the frequency band may be set wider than that in the shooting composition changing state, and the movable range may be increased so as to match with the mechanical movable range.

The lens-side control unit 330 calculates the total amount of vibration detected in the interchangeable lens 3 based on the detection signal of the vibration sensor 390. The lens-side control unit 330 calculates the angular vibration amount from the detection signal of the angular velocity sensor 390a, calculates the translational vibration amount from the detection signal of the acceleration sensor 390b, and calculates the total vibration amount using the angular vibration amount and the translational vibration amount.

The lens-side control unit 330 further reads out the vibration isolation coefficient at the time when the detection signal is output and calculates the image plane conversion value based on the total amount of vibration and the vibration isolation coefficient. At this time, the lens-side control unit 330 calculates the image plane conversion value without considering a drive range (the mechanical movable range and a movable range in terms of the control) of the vibration correction lens 361b. Here, the mechanical movable range means the movable range based on a holding mechanism of the vibration correction lens 361b, and the movable range in terms of the control means the movable range limited by the user's setting and the shooting conditions.

The lens-side control unit 330 also calculates the amount of movement of the vibration correction lens 361b in the X-axis direction and the Y-axis direction in consideration of the mechanical movable range and the movable range in terms of the control. The amount of movement may be calculated as target coordinate values (target positions) in the X-axis direction and the Y-axis direction.

The lens-side control unit 330 having calculated the amount of movement or the target position of the vibration correction lens 361b outputs a drive signal to the lens drive unit 370b to drive the vibration correction lens 361b. The lens drive unit 370b having received the drive signal moves the vibration correction lens 361b in the X-axis and Y-axis directions that intersect the optical axis O, respectively. Further, the lens drive unit 370b periodically detects the positions of the vibration correction lens 361b in the X-axis direction and the Y-axis direction, and outputs them to the lens-side control unit 330 as the present position. The lens side control unit 330 may use the values output from the lens drive unit 370b as the data 92h and 92i as they are or may use the values obtained by performing calculations such as the image plane conversion as the data 92h and 92i.

Further, the lens-side control unit 330 calculates the residual vibration amounts in the X-axis direction and the Y-axis direction, respectively, based on the difference between the detected present position of the vibration correction lens 361b and the target position thereof. It is to be noted, the residual vibration amount may also be calculated from a difference between the moving amount to the target position calculated by the lens-side control unit 330 and the moving amount calculated from the present position of the vibration correction lens 361b. The lens-side control unit 330 calculates the image plane conversion value of the residual vibration amount by using the vibration isolation coefficient at the time the present position of the vibration correction lens 361b is detected.

The body-side second control unit 230b creates a drive signal based on at least one of the position information of the vibration correction lens 361b received through the hotline communication, the total vibration amount received through the hotline communication, the residual vibration amount received through the hotline communication, and the detection signal output from the vibration sensor 290. And then, the body-side second control unit 230b outputs the above drive signal to the sensor drive unit 265. The sensor drive unit 265 having been received the drive signal moves the image sensor 260 in the X-axis and Y-axis directions that intersect the optical axis O. The drive amount of the image sensor 260 may be the residual vibration amount received by the hotline communication or may be the drive amount required for vibration correction calculated by the body-side second control unit 230b. The calculation of the drive amount in the body-side second control unit 230b may be based on a difference between the total vibration amount and the vibration correction amount received through the hotline communication, the output result of the vibration sensor 290, or both the output result of the vibration sensor 290 and the information received through the hotline communication. At calculating the drive amount by the body-side second control unit 230b, it is preferable to consider the vibration state judged by the interchangeable lens 3 received by the hotline communication.

Figure 6:
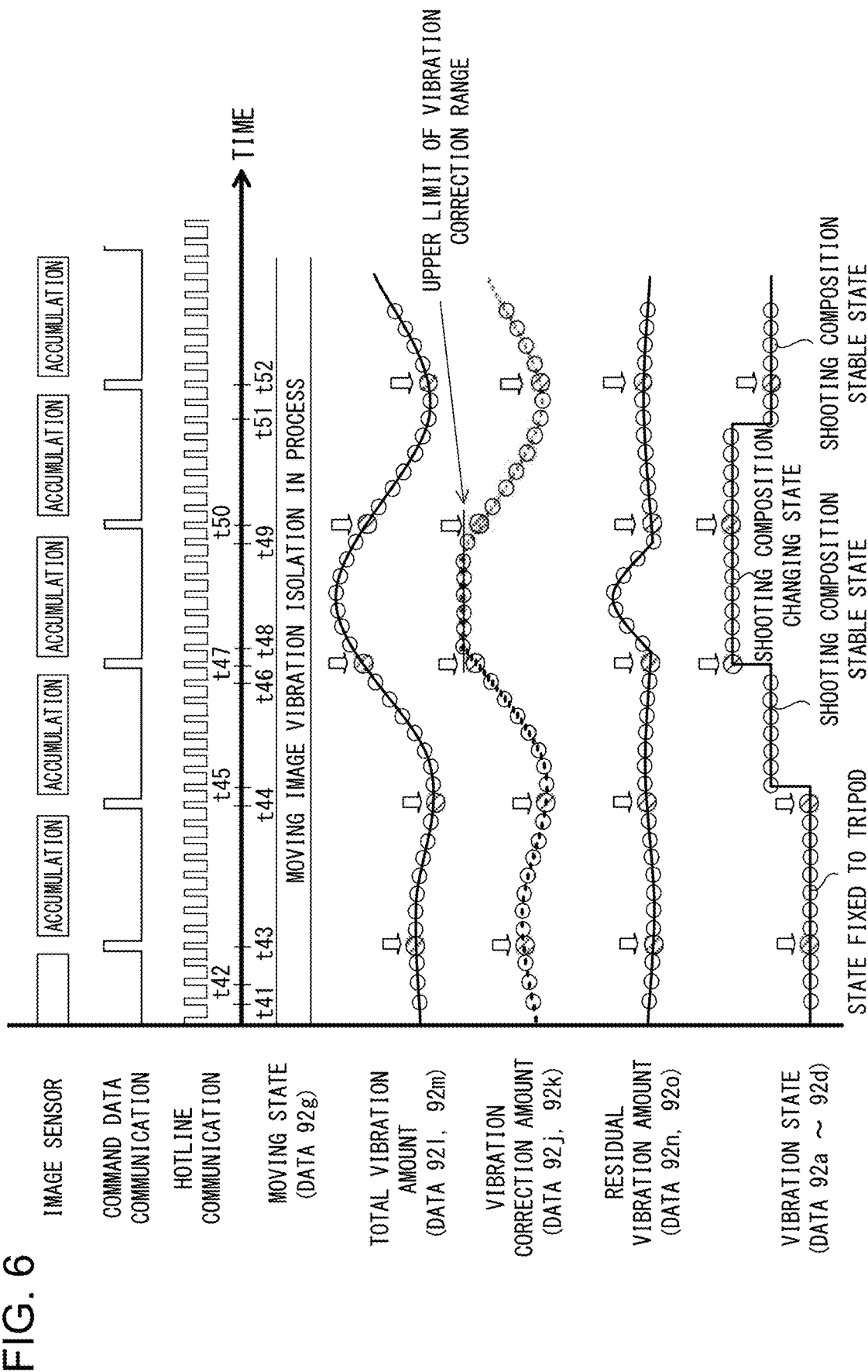
FIG. 6 is a diagram exemplifying a vibration isolation operation.

Hereinafter, an example of the vibration isolation operation will be described with reference to FIG. 6. FIG. 6 shows a timing chart exemplifying timings during the vibration isolation of the moving image. FIG. 6 shows an example in which the vibration correction is performed while capturing a monitor image called a live view image, for example, every 1/60 second.

It is assumed that, before the timing chart shown in FIG. 6, the hotline communication is started, an instruction to start the moving image vibration isolation is transmitted from the camera body 2 to the interchangeable lens 3 by the command data communication, and driving by the lens driving unit 370b is started.

For example, the camera body 2 performs the command data communication with the interchangeable lens 3 after each charge accumulation by the image sensor 260. The body-side first control unit 230a periodically performs the command data communication based on a frame rate, as indicated at times t43, t44, t47, . . . . Here, the command data communication performed at the times t43, t44, t47, . . . is for transmitting and receiving information regarding each charge accumulation, and for example, imaging conditions and the like are transmitted from the camera body 2 to the interchangeable lens 3, and the focal length and the like are transmitted from the interchangeable lens 3 to the camera body 2. It is to be noted, some of the information transmitted and received by the command data communication and the information transmitted and received by the hotline communication may be the same as each other. Therefore, the information used by both the body-side first control unit 230a and the body-side second control unit 230b (such as the position information of the vibration correction lens 361b) may be transmitted by both the hotline communication and the command data communication. In that case, it is preferable, from a point of view of a data amount, that in the hotline communication, coordinate values are transmitted as the position information of the vibration correction lens 361b, and in the command data communication, numerical values indicating an amount of movement of the vibration correction lens 361b (difference in coordinate values) is transmitted.

Further, the command data communication that is not based on the frame rate (such as an instruction for focus drive) may be performed between each of the command data communication at the times t43, t44, t47, . . . .

As shown at each times t41, t42, . . . , the lens-side control unit 330 creates the hotline data 90 based on a cycle of the hotline communication and transmits them from the lens-side second communication unit 340b to the camera body 2. The body-side second communication unit 240b outputs the hotline data 90 having received at the times t41, t42, . . . to the body-side first control unit 230a and the body-side second control unit 230b, respectively.

In FIG. 6, the data 92a to 92d, 92g, and 92l to 92o are shown as an example of the second data 92. In the curves showing the data 92a to 92d and 92l to 92o, each timing of the command data communication is indicated by an arrow and each timing of the hotline communication is indicated by a circle.

Although omitted from FIG. 6, it is assumed that to the data 92e and 92f the lens-side control unit 330 sets an identifier indicating that each of the data 92h to 92o is valid. Further, in FIG. 6, it is assumed that the lens-side control unit 330 sets an identifier indicating "a state engaged in a moving image vibration isolation" to the data 92g.

In FIG. 6, the curves showing the data 92l to 92o exemplify, for example, values in either the X-axis or the Y-axis. Further, the residual vibration amount is shown by exaggerating (by adjusting the scale) the difference between the total vibration amount and the vibration correction amount.

In a case where the information of the interchangeable lens 3 is to be transmitted to the camera body 2 only by the command data communication without using the hotline communication, only the information at the time points with the arrows can be transmitted. Therefore, if the total vibration amount exceeds an upper limit of the vibration correction range as in the times t48 to t49, the residual vibration amount cannot be transmitted to the camera body 2 until the next command data communication at time t50.

However, in the present embodiment, since the information of the interchangeable lens 3 can be transmitted to the camera body 2 by the hotline communication, the information at the times indicated by the circles can also be transmitted in addition to at the times indicated by the arrows to the camera body 2. Thereby, it becomes possible to transmit the residual vibration amount to the camera body 2 during a period (the times t48 to t49) that the total vibration amount exceeds the upper limit of the vibration correction range.

By such a configuration, it becomes possible to enhance the effect of the vibration correction while simplifying the control of vibration correction, such as by correcting by the body-side second control unit 230b the residual vibration amount that cannot be completely corrected by the interchangeable lens 3.

Further, since the body-side second control unit 230b can continuously recognize the vibration correction amount or the total vibration amount of the interchangeable lens 3 in a shorter cycle by the hotline communication, it is possible to perform the vibration correction control according to the vibration correction amount or the total vibration amount of the interchangeable lens 3. For example, the body-side second control unit 230b may perform a control to correct an amount obtained by subtracting a vibration correction amount of the interchangeable lens 3 from a body-side total vibration amount calculated from the detection signal of the vibration sensor 290, or may perform a control to correct an amount obtained by subtracting a vibration correction amount from the total vibration amount in the interchangeable lens 3. Further, the body-side second control unit 230b may judge whether or not the total vibration amount in the interchangeable lens 3 matches with the body-side total vibration amount calculated from the detection signal of the vibration sensor 290. Here, if the camera body 2 does not recognize the amount of vibration correction in the interchangeable lens 3, there is a possibility that the vibration correction effect of the interchangeable lens 3 and the vibration correction effect of the camera body 2 may cancel each other out or the vibration correction is excessively performed. However, according to the present embodiment, since the vibration correction amount and the total vibration amount are transmitted by the hotline communication, the vibration correction effect can be enhanced by collaboration of the camera body 2 and the interchangeable lens 3.

Based on the detection signal of the vibration sensor 390, the lens-side control unit 330 sets to the data 92a to 92d: an identifier indicating "a state being fixed to the tripod" between times t41 and t44, an identifier indicating "a shooting composition stable state" between times t45 and t46 and after time t51, and an identifier indicating "a shooting composition changing state" between times t47 and t51.

Here, assuming that the vibration state is transmitted by the command data communication without the hotline communication, even if the lens-side control unit 30 recognizes the shooting composition stable state as in the times t51 to t52, it is not possible to transmit the vibration state to the camera body 2 until the next command data communication at the time t52. Further, while the lens-side control unit 30 recognizes the shooting composition stable state as in the times t45 to t46, the vibration state may change at the time t47 in the next command data communication. However, in the present embodiment, since the vibration state is transmitted by the hotline communication, the vibration state can be periodically transmitted to the camera body 2 at each time point indicated by the circle. Thereby, it is possible to transmit the change of the vibration state detected in the interchangeable lens 3 to the camera body 2 in a shorter cycle.

With such a configuration, the camera body 2 can quickly recognize the vibration state judged in the interchangeable lens 3, and a period of time during which the vibration state of the camera body 2 and the vibration state of the interchangeable lens 3 do not match with one another is reduced. In a case where the vibration states of the interchangeable lens 3 and the camera body 2 do not match with one another, the vibration correction effect of the interchangeable lens 3 and the vibration correction effect of the camera body 2 may not match with one another, and the live view image or the like may look unnatural. However, according to the present embodiment, the effect of the vibration correction can be enhanced by matching the vibration states of the camera body 2 with the interchangeable lens 3 as described below.

For example, it is possible to enhance the vibration correction effect by changing the frequency band for the vibration correction and the movable range of the vibration correction movable portion according to the vibration state. Further, the vibration correction effect can be further enhanced by matching the vibration states of the interchangeable lens 3 and the camera body 2. Furthermore, since the vibration state is transmitted from the interchangeable lens 3 to the camera body 2 by the hotline communication, a period of time during which the vibration states of the interchangeable lens 3 and the camera body 2 do not match can be reduced. If the vibration state is not transmitted by the hotline communication but the vibration state is transmitted from the interchangeable lens 3 to the camera body 2 only by the command data communication, the timing at which the camera body 2 recognizes the detection result of the lens-side vibration state is delayed, and a period of time during which the detection result deviates between the interchangeable lens 3 and the camera body 2 becomes longer. In such a case, deterioration for usability (uncomfortable feeling) of the user with respect to the finder image and the live view image occurs during the vibration correction. However, in the present embodiment, it is possible to reduce a period of time during which the vibration states differ between the interchangeable lens 3 and the camera body 2.

According to the above-described embodiment, the following advantageous effects can be obtained.

The interchangeable lens 3 can periodically notify the camera body 2 of the position information of the vibration correction lens 361b and the information regarding the vibration amount calculated from the detection signal of the vibration sensor 390 by the hotline communication independent of the command data communication. Therefore, the interchangeable lens 3 causes the camera body 2 to recognize the total vibration amount calculated from the detection signal of the vibration sensor 390 or the residual vibration amount and can perform the vibration correction in collaboration with the camera body 2. Further, the interchangeable lens 3 can also transmit the position of the vibration correction lens 361b detected in the direction intersecting the optical axis as the positional information of the vibration correction lens 361b so as to facilitate performing the hotline communication in a short cycle easily. Furthermore, the interchangeable lens 3 can also convert the position information and the amount of vibration information into information at the image plane and transmit the converted information to the camera body 2 so as to reduce the load of the image plane conversion at the camera body 2.

The interchangeable lens 3 can periodically notify the camera body 2 of the position information of the vibration correction lens 361b and the information used to calculate the correction amount for correcting the vibration from the detection signal of the vibration sensor 390 by the hotline communication independent of the command data communication. Thereby, the information used for correcting the vibration can match between the interchangeable lens 3 and the camera body 2. Further, the interchangeable lens 3 transmits the vibration state judged based on the detection signal of the vibration sensor 390 to the camera body 2 by the hotline communication. Thereby, the interchangeable lens 3 and the camera body 2 can perform the vibration correction with the matching vibration states.

Further, the interchangeable lens 3 can also receive an instruction regarding the vibration correction from the camera body 2 by the command data communication while performing the hotline communication. Since the interchangeable lens 3 periodically transmits data regarding the vibration correction lens 361b and data regarding the focusing lens 361a by the hotline communication, it is possible to simultaneously transmit information regarding the vibration correction and information regarding the focusing, therefore, it is possible to perform the vibration correction control and the focusing control in parallel. Furthermore, the output cycle of the detection signal of the vibration sensor 390 is shorter than the cycle of the hotline communication, and the accuracy of the information included in each hotline data can be improved.

The present invention is not limited to the above-mentioned contents. Other aspects conceivable within the scope of the technical idea of the present invention are also included within the scope of the present invention.

Variation 1

In the above description, an example of using the DMA function in the hotline communication has been described. Instead of using the DMA function, the hotline data 90 may be generated by using a CPU. In Variation 1, the HDATA signal is transmitted by the lens-side second communication unit 340*b*, and the hotline data 90 is generated by the lens-side control unit 330. With such a configuration, the hotline communication and the hotline data 90 generation can be performed in parallel without using the DMA function. However, the hotline data 90 is generated within a period not exceeding one cycle of the hotline communication.

Variation 2

In the above description, an example in which the body-side control unit 230 is divided into the body-side first control unit 230*a* and the body-side second control unit 230*b* has been described. However, it may be configured as one body-side control unit 230 without being divided into the body-side first control unit 230*a* and the body-side second control unit 230*b*. In such a case, the body-side control unit 230 may directly control the sensor drive unit 265, and the communication line of the body-side second communication unit 240*b* may be connected to only one body-side control unit 230.

Further, in the example of the hotline communication with reference to FIG. 4, the data transfer direction of the clock synchronous communication using only two of the HCLK signal line and the HDATA signal line, is set to one direction from the interchangeable lens 3 to the camera body 2. However, another signal line may be added so that data can be bidirectional transferred. Alternatively, the input and output of the HDATA signal line may be configured in switchable so that bidirectional data communication can be performed.

The hotline communication is not limited to the clock synchronous type, and UART (Universal Asynchronous Receiver Transmitter) may be used. Further, in addition to the clock signal line and the data signal line, a handshake signal line or a CS (chip select) signal line may be added so that the body-side first control unit 230*a* and the body-side second control unit 230*b* may be arranged to start the communication at the same time as the communication by the lens side control unit 330.

Variation 3

The camera body 2 may be configured to perform the vibration correction by moving the position of the image by an image processing performed by the signal processing unit 270 without providing the sensor drive unit 265 that drives the image sensor 260 in the direction intersecting the optical axis O. Alternatively, in the camera body 2, the vibration correction by the sensor drive unit 265 and the vibration correction by the signal processing unit 270 may be performed in combination.

Variation 4

The interchangeable lens 3 and the camera body 2 may be configured to perform the vibration correction according to a preset sharing ratio. For example, the sharing ratio (correction factor) of the vibration correction to be performed by the interchangeable lens 3 and by the camera body 2 may be determined in advance, and the sharing ratio may be included in the command data communication of the vibration isolation start instruction. The lens-side control unit 330 moves the vibration correction lens 361*b* so as to counteract a vibration amount obtained by multiplying the calculated total vibration amount by the sharing ratio at the interchangeable lens 3.

On the other hand, the body-side second control unit 230*b* may perform the vibration correction control so as to counteract a vibration amount obtained by multiplying the total vibration amount transmitted through the hotline communication or calculated based on the vibration sensor 290 by the sharing ratio at the camera body 2.

According to the variation 4, by determining in advance the sharing ratio of the vibration correction performed by and shared between the interchangeable lens 3 and the camera body 2, the vibration correction can be appropriately shared between the interchangeable lens 3 and the camera body 2.

Sharing of the vibration correction between the interchangeable lens 3 and the camera body 2 may be determined as a sharing ratio or may be determined as a predetermined correction amount. Further, the camera body 2 may be arranged to correct a part of the vibration amount that exceeds the drive range of the vibration correction lens 361*b*. Furthermore, the controllable drive range of the vibration correction lens 361*b* may be transmitted to the camera body 2 by the hotline communication, and the camera body 2 may correct a part of the vibration amount exceeding the controllable drive range.

Variation 5

The interchangeable lens 3 and the camera body 2 may be configured to share the vibration correction according to components of the vibration. For example, the interchangeable lens 3 may correct the angular vibration, and the camera body 2 may correct the vibration around the optical axis O and the translational vibration. Alternatively, the interchangeable lens 3 may correct the angular vibration and a predetermined amount of translational vibration, and the camera body 2 may correct the vibration around the optical axis O and the remaining translational vibration. The predetermined amount of translational vibration may be a degree of correction amount that does not cause any adverse effect on the optical performance of the imaging optical system 360. In the case of the variation 5, the lens-side control unit 330 may include data on the components of the vibration that are not performed in the hotline data 90.

Variation 6

It was described that the body-side second control unit 230*b* performed the vibration correction control suitable for the vibration state in the transmitted the hotline data 90, however it is not limited to this. In the present embodiment, since the camera body 2 is also provided with the vibration sensor 290, the body-side second control unit 230*b* may perform the vibration correction control in consideration of both the hotline data 90 and the detection signal of the vibration sensor 290.

Variation 7

In a case where the interchangeable lens 3 is provided with the instruction unit 375, the vibration isolation mode instructed by the instruction unit 375 of the interchangeable lens 3 may be transmitted by the hotline communication. Since the vibration isolation mode can be set by either the instruction unit 375 of the interchangeable lens 3 or the operating member 280 of the camera body 2, the vibration isolation mode settings may not match between the camera body 2 and the interchangeable lens 3. In the present embodiment, the frequency band of the vibration to be corrected and the movable range of the movable portion can also be changed according to the vibration isolation mode. In a case where the vibration isolation mode is the sports mode, the movable range may be set in a narrower range in order to respond to the shooting at a shutter speed faster than that of the normal mode. In a case where the vibration isolation mode is the normal mode, the movable range can be increased such as to match with the mechanical movable range to enhance the effect of the vibration correction.

In the variation 7, in a case where the vibration isolation mode does not match between the camera body 2 and the interchangeable lens 3, the vibration isolation mode of the camera body 2 adopts the vibration isolation mode instructed by the instruction unit 375 of the interchangeable lens 3. If the vibration isolation modes do not match between the camera body 2 and the interchangeable lens 3, the vibration correction effect of the interchangeable lens 3 and the vibration correction effect of the camera body 2 do not match, and there may be a case that the live view image or the like may be seen as unnatural. In the present embodiment, the operation by the operation member 280 is transmitted to the body-side first control unit 230a, and the instruction by the instruction unit 375 is transmitted to the body-side first control unit 230a by the hotline communication. Therefore, the body-side first control unit 230a can recognize the vibration isolation modes of the camera body 2 and the interchangeable lens 3, and the body-side first control unit 230a can match the vibration isolation modes between the camera body 2 and the interchangeable lens 3 by transmitting the vibration isolation mode of the interchangeable lens 3 to the body-side second control unit 230b. Further, the body-side first control unit 230a may alert the user on the display unit 285 that the vibration isolation mode does not match.

The disclosure of the following priority application is herein incorporated by reference: Japanese Patent Application No. 2018-137271 filed Jul. 20, 2018.

REFERENCE SIGNS LIST

3 . . . Camera System, 2 . . . Camera Body, 10 . . . Interchangeable Lens, 90 . . . Hotline Data, 230 . . . Body-side Control Unit, 235 . . . Storage Unit, 240 . . . Body-side Communication Unit, 265 . . . Sensor Drive Unit. 270 . . . Signal Processing Unit, 330 . . . Lens-side Control Unit, 340 . . . Lens-side Communication Unit, 350 . . . Lens-side Storage Unit, 360 . . . Imaging Optical System, 370 . . . Lens Drive Unit

The invention claimed is:

1. A camera accessory that is attachable to and detachable from a camera body, the camera accessory comprising:
a correction optical system that is movable in a direction intersecting an optical axis thereof;
a first communicator that transmits to the camera body both (i) first information recording a position of the correction optical system and (ii) second information that is different from the first information and that is regarding a vibration detected by the camera accessory; and
a second communicator that receives an instruction from the camera body,
wherein the second communicator receives an instruction to start communication of the first communicator.

2. The camera accessory according to claim 1, wherein:
the second information represents an amount of vibration of an image on an image plane caused by the vibration of the camera accessory.

3. The camera accessory according to claim 1, wherein:
the first communicator repeatedly transmits information including at least the first information and the second information.

4. The camera accessory according to claim 1, wherein:
the first communicator periodically transmits the first information and the second information in a cycle shorter than a cycle in which the second communicator receives the instruction from the camera body.

5. The camera accessory according to claim 1, wherein:
the second communicator receives an instruction to start a correction of the vibration; and
the camera accessory further comprises a drive unit that moves the correction optical system in the direction intersecting the optical axis.

6. The camera accessory according to claim 1, wherein:
the first information relates to a position of the correction optical system in the direction intersecting the optical axis.

7. The camera accessory according to claim 6, wherein:
the first information has a value obtained by converting the position of the correction optical system into a position on an image plane.

8. The camera accessory according to claim 1, wherein:
the first communicator periodically transmits a moving state of the correction optical system in the direction intersecting the optical axis to the camera body.

9. The camera accessory according to claim 1, wherein:
the first communicator periodically transmits data of a fixed length including the first information and the second information to the camera body.

10. The camera accessory according to claim 1, further comprising:
a vibration detector that detects the vibration of the camera accessory and outputs a detected signal, wherein:
the vibration detector periodically outputs the detected signal in a cycle shorter than a cycle in which the first communicator transmits the first information and the second information.

11. The camera accessory according to claim 10, wherein:
the first communicator periodically transmits a vibration state judged based on the detected signal from the vibration detector to the camera body.

12. The camera accessory according to claim 1, wherein:
the first information represents a vibration correction amount corrected by the camera accessory, and
the second information represents an amount of the vibration detected by the camera accessory.

13. The camera accessory according to claim 1, wherein:
the first information is a value obtained by converting the position of the correction optical system to a position in an image forming plane,
the second information is a value obtained by converting an amount of the vibration detected by the camera accessory to the position in the image forming plane, and
the value of the second information is smaller than the value of the first information.

14. The camera accessory according to claim 1, wherein:
the first communicator and the second communicator can communicate independently of each other, the first communicator performs one-way communication to the camera body, and the second communicator performs bidirectional communication with the camera body.

15. The camera accessory according to claim 1, wherein:

the first communicator communicates using a communication line comprising a first clock communication line on which a first clock signal is communicated to the camera body and a first data communication line on which data is communicated to the camera body in synchronization with the first clock signal, and the second communicator communicates using a communication line comprising a second clock communication line on which a second clock signal is communicated from the camera body, a second data communication line on which data is communicated from the camera body in synchronization with the second clock signal, and a third data communication line on which data is communicated from the camera body in synchronization with the second clock signal.

16. The camera accessory according to claim 1, wherein:

the second communicator transmits data periodically until an indication of termination is sent by the first communicator.

17. A method of transmitting information between a camera accessory that is attachable to and detachable from a camera body and the camera body, the method comprising:

transmitting, between the camera body and the camera accessory, both (i) first information regarding a position of a correction optical system and (ii) second information that is different from the first information and that is regarding a vibration of the camera accessory;

receiving an instruction from the camera body; and receiving an instruction to start communication between the camera body and the camera accessory.

18. A camera body to which an interchangeable lens with a correction lens movable in a direction intersecting an optical axis can be attached, the camera body comprising:

a first communicator that receives both (i) first information regarding a position of the correction lens and (ii) second information that is different from the first information and that is regarding a vibration detected by the interchangeable lens; and a second communicator that transmits an instruction to the interchangeable lens, wherein the second communicator transmits an instruction to start communication of the first communicator.

19. The camera body according to claim 18, further comprising:

an image sensor that captures an image formed by the interchangeable lens, and a drive unit that moves the image sensor based on the first information and the second information.

20. The camera body according to claim 18, wherein:

the first communicator has a first data signal line terminal where data from the interchangeable lens is received, the second communicator has (i) a clock signal line terminal from which a clock signal is output, (ii) a second data signal line terminal from which data is transmitted to the interchangeable lens in synchronization with the clock signal, and (iii) a third data signal line terminal from which data is received from the interchangeable lens in synchronization with the clock signal, the first communicator receives the first information and the second information via the first data signal line terminal, and the second communicator transmits the instruction to start communication of the first communicator via the second data signal line terminal.

* * * * *